(12) United States Patent
Li et al.

(10) Patent No.: US 11,246,061 B2
(45) Date of Patent: Feb. 8, 2022

(54) VOICE SERVICE PROCESSING METHOD AND TERMINAL DEVICE

(71) Applicant: HONOR DEVICE CO., LTD., Shenzhen (CN)

(72) Inventors: Zhongjin Li, Xi'an (CN); Wenjie Duan, Xi'an (CN); Zhichao Chen, Xi'an (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 117 days.

(21) Appl. No.: 16/089,440

(22) PCT Filed: Mar. 30, 2016

(86) PCT No.: PCT/CN2016/077871
§ 371 (c)(1),
(2) Date: Sep. 28, 2018

(87) PCT Pub. No.: WO2017/166124
PCT Pub. Date: Oct. 5, 2017

(65) Prior Publication Data
US 2019/0124560 A1    Apr. 25, 2019

(51) Int. Cl.
*H04W 36/36* (2009.01)
*H04W 36/14* (2009.01)
*H04W 36/00* (2009.01)

(52) U.S. Cl.
CPC ....... *H04W 36/0022* (2013.01); *H04W 36/36* (2013.01); *H04W 36/14* (2013.01)

(58) Field of Classification Search
USPC ........................................................ 370/331
See application file for complete search history.

(56) References Cited

U.S. PATENT DOCUMENTS

2012/0064884 A1    3/2012  Ramachandran et al.
2012/0214489 A1*   8/2012  Koo .................. H04W 36/0083
                                                    455/436
(Continued)

FOREIGN PATENT DOCUMENTS

CN    102868932 A    1/2013
CN    103108402 A    5/2013
(Continued)

OTHER PUBLICATIONS

Office Action issued in Chinese Application No. 201680077662.6 dated Oct. 31, 2019, 11 pages (with English translation).
(Continued)

*Primary Examiner* — Gregory B Sefcheck
*Assistant Examiner* — Majid Esmaeilian

(57) ABSTRACT

The present invention provides a voice service processing method and a terminal device. The method includes: sending, by a terminal device, a first message to a network device of a first network, where the first message is used to request a circuit switched fallback CSFB voice service; receiving, by the terminal device, a second message sent by the network device of the first network, where the second message is used to instruct the terminal device to perform network redirection; if the second message carries no frequency information, determining, by the terminal device, a redirection frequency, where the redirection frequency is a frequency supported by a second network; and sending, by the terminal device based on the redirection frequency, a connection request to a network device of the second network, to perform a CS voice service.

12 Claims, 4 Drawing Sheets

(56) References Cited

U.S. PATENT DOCUMENTS

| | | | | |
|---|---|---|---|---|
| 2013/0195078 | A1* | 8/2013 | Kobayashi | H04W 36/165 370/331 |
| 2013/0223391 | A1* | 8/2013 | Koo | H04W 72/1215 370/329 |
| 2014/0113636 | A1* | 4/2014 | Lee | H04W 76/16 455/437 |
| 2015/0071167 | A1* | 3/2015 | Islam | H04W 36/0022 370/328 |
| 2016/0278061 | A1* | 9/2016 | Peng | H04L 43/16 |
| 2017/0105147 | A1 | 4/2017 | Jiang et al. | |
| 2018/0152865 | A1* | 5/2018 | Atri | H04W 36/30 |
| 2019/0044639 | A1* | 2/2019 | Ouchi | H04W 52/34 |

FOREIGN PATENT DOCUMENTS

| | | |
|---|---|---|
| CN | 103190176 A | 7/2013 |
| CN | 103200516 A | 7/2013 |
| CN | 103229554 A | 7/2013 |
| CN | 103476073 A | 12/2013 |
| CN | 103634881 A | 3/2014 |
| CN | 103702393 A | 4/2014 |
| CN | 104363618 A | 2/2015 |
| CN | 104853232 A | 8/2015 |
| CN | 105338583 A | 2/2016 |
| WO | 2011163405 A1 | 12/2011 |
| WO | 2016011603 A1 | 1/2016 |

OTHER PUBLICATIONS

Search Report issued in Chinese Application No. 201680077662.6 dated Oct. 18, 2019, 3 pages.
International Search Report and Written Opinion issued in International Application No. PCT/CN2016/0//871 dated Dec. 15, 2016, 21 pages.
Office Action dated Jul. 30, 2020, issued in counterpart CN Application No. 201680077662.6, with English translation (6 pages).
Office Action issued in Chinese Application No. 201680077662.6 dated Apr. 8, 2020, 13 pages (with English translation).

* cited by examiner

VOICE SERVICE PROCESSING METHOD AND TERMINAL DEVICE

CROSS-REFERENCE TO RELATED APPLICATIONS

This application is a National Stage of International Application No. PCT/CN2016/077871, filed Mar. 30, 2016, which is hereby incorporated by reference in their entireties.

TECHNICAL FIELD

Embodiments of the present invention relate to the communications field, and more specifically, to a voice service processing method and a terminal device.

BACKGROUND

With further evolution of wireless communications technologies, currently, a wireless communications system has evolved into the fourth generation mobile communications system (Fourth Generation Mobile Communications Systems, "4G" for short). However, 4G does not support running of a circuit switched (Circuit Switch, "CS" for short) service. Therefore, after 4G is deployed in a wireless network, a current mainstream voice solution is circuit switched fallback (Circuit Switched Fallback, "CSFB" for short). That is, after a 4G calling user or called user receives a paging message, a terminal device falls back to the third generation mobile communications system (Third Generation Mobile Communication Systems, "3G" for short) or the second generation mobile communications system (Second Generation Mobile Communication Systems, "2G" for short), to perform a voice service, and fast returns (Fast Return, "FR" for short) to 4G after the voice service is ended. However, when the existing CSFB solution is used, a 4G mobile originating/terminating call is often disconnected. This affects mobile phone communication experience of a user.

SUMMARY

The present invention provides a voice service processing method and a terminal device, so that when the terminal device needs to perform a voice service, even if the terminal device receives no frequency information delivered by a network, the terminal device can determine an appropriate redirection frequency, and access, based on the redirection frequency, a network that supports the voice service, to answer a call or make a call. Therefore, voice communication experience of a user is improved.

For ease of understanding embodiments of the present invention, an element that is used in description of the embodiments of the present invention is first described herein.

In terms of circuit switched fallback (Circuit Switched Fallback, "CSFB" for short), after accessing a network that does not support a CS service, when a terminal device needs to perform a CS service, the terminal device falls back to a network that supports a CS service from the network that does not support a CS service. For example, after accessing a 4G network, when the terminal device needs to perform voice communication, the terminal device needs to fall back to a 2G or 3G network.

According to a first aspect, a voice service processing method is provided, where the method includes: sending, by a terminal device, a first message to a network device of a first network, where the first message is used to request a circuit switched fallback CSFB voice service; receiving, by the terminal device, a second message sent by the network device of the first network, where the second message is used to instruct the terminal device to perform network redirection; if the second message carries no frequency information, determining, by the terminal device, a redirection frequency, where the redirection frequency is a frequency supported by a second network; and sending, by the terminal device based on the redirection frequency, a connection request to a network device of the second network, to perform a CS voice service.

In the embodiments of the present invention, the first network may be a network that supports only a packet switched (Packet Switch, "PS" for short) service but does not support a CS service, for example, a 4G Long Term Evolution (Long Term Evolution, "LTE" for short) network. The second network is a network that supports a CS service, for example, a 2G network or a 3G network.

Therefore, according to the voice service processing method in the embodiments of the present invention, when the terminal device needs to perform a voice service, even if the terminal device receives no frequency information delivered by a network, the terminal device can determine an appropriate redirection frequency, and access, based on the redirection frequency, a network that supports the voice service, to answer a call or make a call. Therefore, voice communication experience of a user is improved.

With reference to the first aspect, in a first possible implementation of the first aspect, the determining, by the terminal device, a redirection frequency includes: obtaining, by the terminal device, first historical frequencies, where the first historical frequencies are frequencies that are used before the terminal device determines the redirection frequency and that are used to access the second network by the terminal device in a process in which the terminal device is handed over from the first network to the second network; and determining, by the terminal device, one of the first historical frequencies as the redirection frequency.

Optionally, the terminal device may save, in each successful CSFB process, a frequency that is used by the terminal device to perform fallback in this CSFB process. Then, even if the terminal device receives no frequency information delivered by the network device, the terminal device can select, from saved frequencies, a frequency that is to be used during fallback. Therefore, time consumed for a fallback process can be reduced, and the voice communication experience of the user can be improved.

It should be noted that there may be one or more first historical frequencies, and generally, there are a plurality of first historical frequencies.

With reference to the first aspect, in a second possible implementation of the first aspect, the determining, by the terminal device, a redirection frequency includes: obtaining, by the terminal device, second historical frequencies, where the second historical frequencies are frequencies that are used before the terminal device determines the redirection frequency and that are used to access the second network by another terminal device in a process in which the another terminal device is handed over from the first network to the second network; and determining, by the terminal device, one of the second historical frequencies as the redirection frequency.

It should be noted that there may be one or more second historical frequencies, and generally, there are a plurality of second historical frequencies.

With reference to the second possible implementation of the first aspect, in a third possible implementation of the first aspect, a location area of the another terminal in the process in which the another terminal device is handed over from the first network to the second network is the same as a current location area of the terminal device.

Therefore, the terminal device can directly obtain a frequency that can be used to perform fallback in the current location area, so that a fallback success rate can be improved, time consumed for a fallback process can be reduced, and the voice communication experience of the user can be improved.

With reference to the second or the third possible implementation of the first aspect, in a fourth possible implementation of the first aspect, the obtaining, by the terminal device, second historical frequencies includes: receiving, by the terminal device, the second historical frequencies sent by a cloud server.

Optionally, the terminal device may establish device-to-device (Device to Device, "D2D" for short) communication with another terminal device, to receive a historical frequency that is saved and sent by the another terminal device.

Alternatively, the terminal device may perform information transmission with another terminal device by using Bluetooth, to receive a historical frequency that is saved and sent by the another terminal device.

Therefore, when the terminal device receives no frequency information delivered by the network device, the terminal device can select, from frequencies that are used to access the second network by another terminal device in the process in which the another terminal device is handed over from the first network to the second network, a frequency that is to be used during fallback. Therefore, the frequency that is to be used during fallback can be determined more quickly, time consumed for a fallback process can be reduced, and the voice communication experience of the user can be improved.

With reference to any one of the first aspect or the first to the fourth possible implementations of the first aspect, in a fifth possible implementation of the first aspect, the method further includes: saving, by the terminal device, a correspondence between the first network and the redirection frequency.

With reference to any one of the first aspect or the first to the fifth possible implementations of the first aspect, in a sixth possible implementation of the first aspect, the first network is a 4G network, and the second network is a 2G network.

Currently, a coverage area of the 2G network is wider than a coverage area of the 3G network. Therefore, during circuit switched fallback, the terminal device preferentially chooses to fall back to the 2G network. In this way, network configuration and optimization can be simplified.

According to a second aspect, a terminal device is provided, where the terminal device is configured to perform the method in the first aspect or any possible implementation of the first aspect. Specifically, the terminal device includes units configured to perform the method in the first aspect or any possible implementation of the first aspect.

According to a third aspect, a terminal device is provided, where the terminal device includes a processor, a memory, and a transceiver, where the processor, the memory, and the transceiver are connected by using a bus system, the memory is configured to store an instruction, the transceiver is controlled by the processor to receive and send a message, to implement communication between the terminal device and a network device, and the processor is configured to invoke the instruction stored in the memory, to perform the method in the first aspect or any possible implementation of the first aspect.

According to a fourth aspect, a computer readable medium is provided, where the computer readable medium is configured to store a computer program, and the computer program includes an instruction used to perform the method in the first aspect or any possible implementation of the first aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
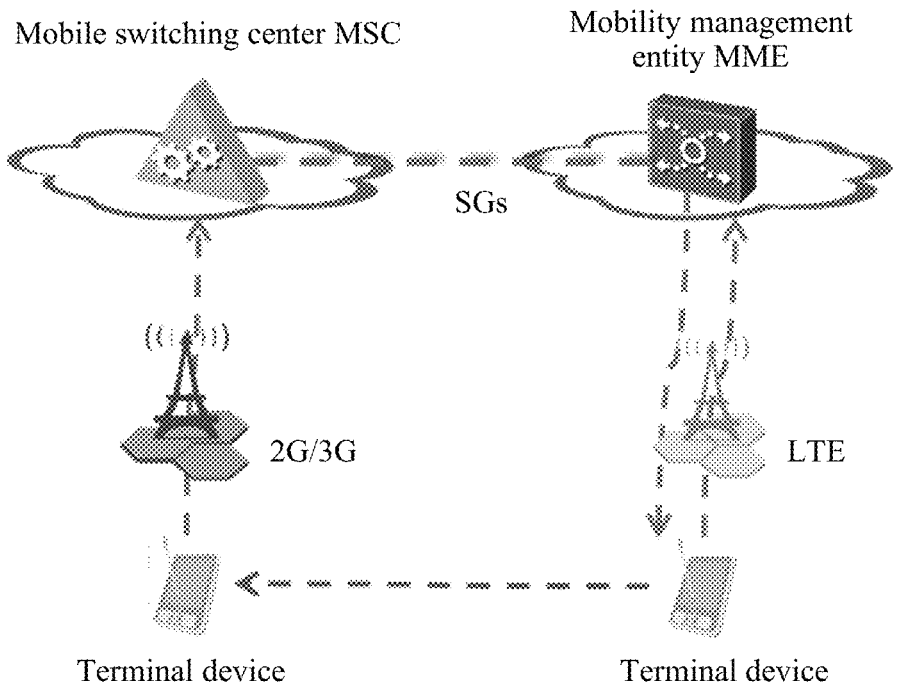
FIG. 1(a) and FIG. 1(b) are application scenario diagrams according to an embodiment of the present invention.
Figure 1:
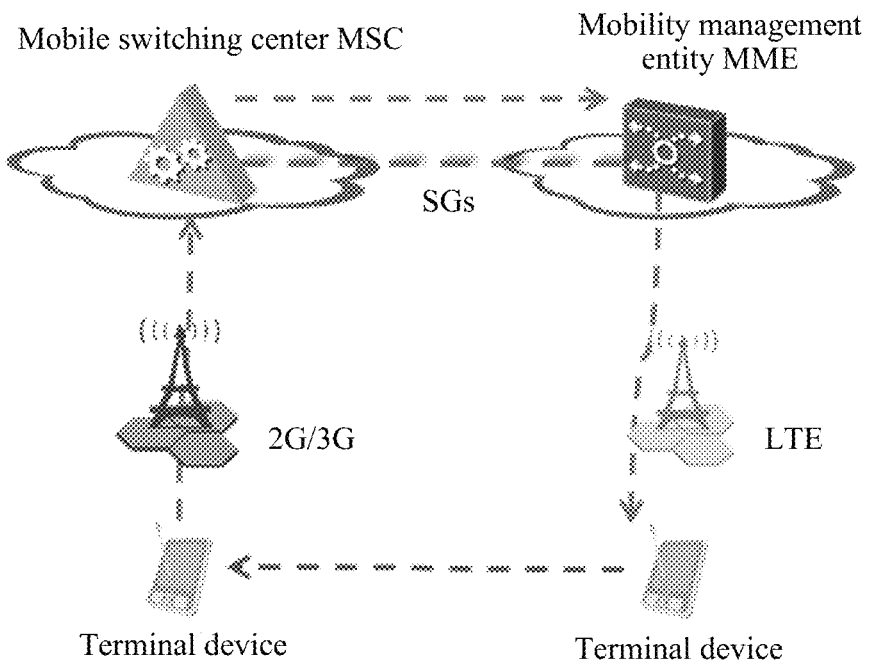

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to various communications systems, for example, a Global System for Mobile Communications (Global System of Mobile Communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunication System (Universal Mobile Telecommunication System, "UMTS" for short), and a future 5G communications system.

In the embodiments of the present invention, a terminal device (Terminal Equipment) may also be referred to as user equipment, a mobile station (Mobile Station, "MS" for short), a mobile terminal (Mobile Terminal), or the like. The user equipment may communicate with one or more core networks by using a radio access network (Radio Access Network, "RAN" for short). For example, the user equipment may be a mobile phone (or referred to as a "cellular" phone), or a computer with a mobile terminal. For example, the user equipment may be a portable, pocket-sized, handheld, computer built-in, or in-vehicle mobile apparatus, a terminal device in a future 5G network, or a terminal device in a future evolved PLMN network.

In the embodiments of the present invention, a network device may be a device configured to communicate with user equipment. The network device may be a base transceiver station (Base Transceiver Station, "BTS" for short) in a GSM system or CDMA, may be a NodeB (NodeB, "NB" for short) in a WCDMA system, or may be an evolved NodeB (Evolutional Node B, "eNB" or "eNodeB" for short) in an LTE system. Alternatively, the network device may be a relay station, an access point, an in-vehicle device, a wearable device, a network device in a future 5G network, a network device in a future evolved PLMN network, or the like.

FIG. 1(a) and FIG. 1(b) are application scenario diagrams according to an embodiment of the present invention. As shown in FIG. 1(a) and FIG. 1(b), an SGs interface is established between a mobility management entity (Mobility Management Entity, "MME" for short) and a mobile switching center (Mobile Switching Center, "MSC" for short), to associate an LTE network with a 3G/2G network.

A terminal device supports circuit switched fallback (Circuit Switched Fallback, "CSFB" for short). When the terminal device is switched on, the terminal device is registered with both the LTE network and the 2G/3G network, and preferentially camps on the LTE network. As shown in FIG. 1(a), when the terminal device needs to initiate paging, the terminal device initiates a voice service request to the MME. The MME instructs the terminal device to fall back to the 2G/3G network. The terminal device falls back to the 2G/3G network according to the instruction from the MME, and makes a mobile originating call (Mobile Origination Call, "MO" for short) in the 2G/3G network according to a normal procedure. As shown in FIG. 1 (b), after the MME receives a paging message that is sent by the MSC by using the SGs interface, the MME pages the terminal device and instructs the terminal device to fall back to the 2G/3G network. After falling back to the 2G/3G network according to the instruction from the MME, the terminal device completes a called connection according to a normal procedure.

After completing a voice call, the terminal device returns to the LTE network for camp-on.

Figure 2:
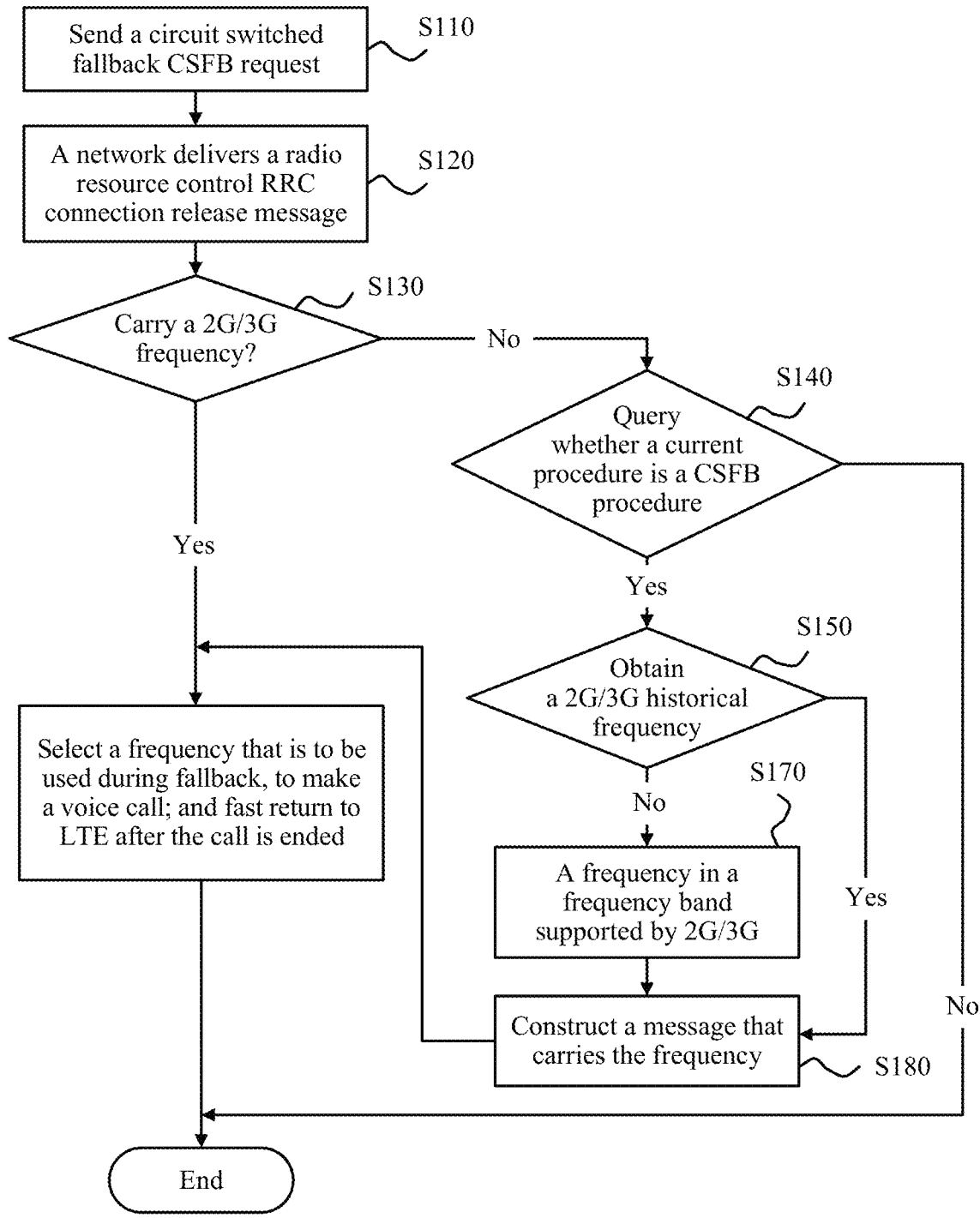
FIG. 2 is a schematic flowchart of a voice service processing method according to an embodiment of the present invention.

FIG. 2 is a schematic flowchart of a voice service processing method according to an embodiment of the present invention. As shown in FIG. 2, the method 100 includes the following steps.

S110. A terminal device sends a circuit switched fallback CSFB request to a network device.

The terminal device accesses a 4G LTE network. When a user needs to make a call or answer a call, the terminal device sends the CSFB request to the network device, to request to fall back to a 2G or 3G network.

S120. The network device delivers a radio resource control RRC connection release (Release) message to the terminal device.

Generally, the RRC release message carries a release reason (for example, other (other)), a redirection standard, and redirection frequency information. However, sometimes, due to an exception on a network side, the RRC release message carries only the release reason, but carries no redirection standard and redirection frequency.

S130. The terminal device determines whether the RRC release message carries frequency information.

Optionally, in S130, if the RRC release message carries frequency information, the terminal device scans 2G/3G frequencies indicated by the frequency information, to receive receiving strength of the frequencies; sorts, according to receiving strength, frequencies delivered by the network, where stronger strength indicates a higher priority; performs a synchronization operation on frequencies with a highest priority according to priorities; and receives a system message after the synchronization succeeds. If an access condition is currently met, and a location area of a 2G/3G frequency is the same as a location area of a frequency delivered by the network to the terminal device during LTE attach, the terminal does not perform a registration operation, but directly performs a subsequent call operation in 2G/3G If an access condition is currently met, but a location area of a 2G/3G frequency is different from a location area delivered by the network to the terminal device during LTE attach, the terminal device performs a location area update (Location Area Update, "LAU" for short) operation on a fallback frequency, performs a subsequent call operation after fallback succeeds, and fast returns (Fast Return, "FR" for short) to 4G after a call is ended.

Optionally, in S130, if the RRC release message received by the terminal device carries no frequency information, according to an existing CSFB solution, the terminal device considers that the received RRC release message is used to instruct the terminal device to release an RRC connection. Then, the terminal device releases an RRC connection to the LTE network. In addition, the terminal device cannot obtain a frequency that is to be used during fallback. Therefore, the terminal device cannot fall back to the 2G/3G network from the LTE network. Consequently, a mobile originating/terminating call of the terminal device is disconnected. However, in this embodiment of the present invention, if the RRC release message received by the terminal device carries no frequency information, the terminal device may perform S140 and steps subsequent to S140, to implement fallback from the LTE network to the 2G/3G network.

S140. If the RRC connection release message carries no frequency information, the terminal device queries whether a current procedure is a CSFB procedure.

Inside the terminal device, an LTE RRC layer may query an LTE non-access stratum (Non Access Stratum, "NAS" for short) about whether the current procedure is a CSFB procedure. Specifically, the RRC layer queries whether the LTE NAS ("LNAS" for short) has sent an extend service request (Extend Service Request, "ESR" for short) message to the LTE network and a service type (Service Type) in the ESR message, to determine whether the current procedure is a CSFB procedure. If the RRC layer finds that the LANS has sent no ESR message to the LTE network, or the LNAS has sent an ESR message to the network, but a service type in the ESR message is neither mobile-originating-CSFB (Mobile-originating-CS-fallback) nor mobile-terminating-CSFB (Mobile-terminating-CS-fallback), the RRC layer determines that the current procedure is not a CSFB procedure. If the RRC layer finds that the LNAS has sent an ESR message to the network, and a service type in the ESR message is either Mobile-originating-CS-fallback or Mobile-terminating-CS-fallback, the RRC layer determines that the current procedure is a CSFB procedure.

S150. The terminal device determines that the current procedure is a CSFB procedure, and the terminal device obtains historical frequencies.

If the network device delivers no frequency that can be used by the terminal device during fallback, the terminal device may obtain the historical frequencies, and determine an available frequency from the historical frequencies according to a prior-art procedure, and then fall back to the 2G/3G network by using the frequency, to make a call or answer a call.

Figure 3:
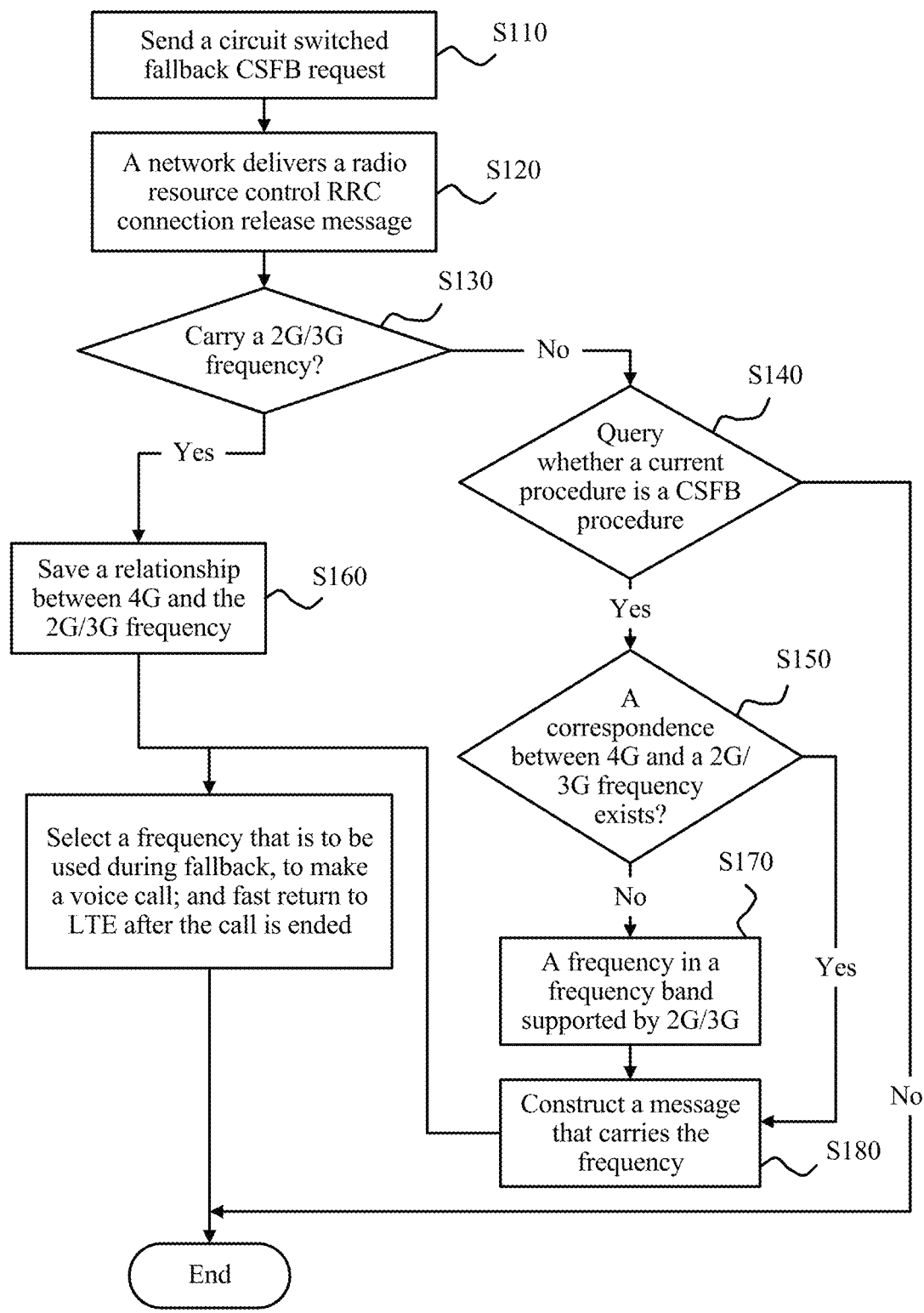
FIG. 3 is another schematic flowchart of a voice service processing method according to an embodiment of the present invention.

In this embodiment of the present invention, optionally, the historical frequencies may be saved by the terminal device. Specifically, as shown in FIG. 3, the method 100 further includes the following steps.

S160. The terminal device saves a relationship between 4G and a 2G/3G frequency.

Specifically, when the received RRC release message delivered by the network device carries a 2G/3G frequency, the terminal device may save a correspondence between 4G and the 2G/3G frequency. Alternatively, after each time the terminal device successfully falls back to 2G/3G from 4G the terminal device may save a correspondence between 4G and a 2G/3G frequency used during this fallback. For example, the correspondence between 4G and a 2G/3G frequency may be saved in a CSFB experience table.

Correspondingly, S150 is specifically: determining whether the correspondence between 4G and a 2G/3G frequency exists in the CSFB experience table.

Therefore, when the terminal device receives no frequency information delivered by the network device, the terminal device may directly obtain the historical frequencies from relationships that are between 4G and a 2G/3G frequency and that are saved by the terminal device, and use an appropriate frequency to perform fallback, to ensure a normal call.

It should be noted that sequence numbers of the foregoing procedures do not necessarily represent an execution sequence of the procedures. For example, S160 is performed before S150. A specific execution sequence is reflected by a logical relationship between steps.

Optionally, for example, the terminal device may save the relationship between 4G and a 2G/3G frequency in a manner shown in Table 1. For example, Table 1 shows information that is saved by the terminal device when a location area identity (Location Area Identification, "LAI" for short), that is, 1234, is corresponding to a plurality of 3G frequencies.

TABLE 1

| Index (Index) | Mobile country code-mobile network code (MCC-MNC) | LAI | Redirect radio access technology (Redirect RAT) | Frequency band (BAND) | Frequency (Freq) |
|---|---|---|---|---|---|
| 1 | 460-01 | 1234 | 3G | ... | 10713 |
|  |  |  | ... | ... | ... |
|  |  |  | ... | ... | ... |
| 2 | 460-00 | ... | ... | ... | ... |
| ... | ... | ... | ... | ... | ... |

Further, the terminal device may save information according to an area range of the terminal device. Alternatively, the terminal device may save, in different relationship tables, correspondences that are between 4G and a 2G/3G frequency and that are corresponding to different areas. Therefore, when entering an area, the terminal device may quickly obtain a frequency that is to be used during fallback, so as to reduce time consumed for fallback.

In this embodiment of the present invention, optionally, when the terminal device enters an area range, the terminal device may delete a correspondence that is between 4G and a 2G/3G frequency and that is previously saved in another area range, to save internal storage space of the terminal.

In this embodiment of the present invention, optionally, the historical frequencies obtained by the terminal device may be frequencies that are used to access the 2G/3G network by another terminal device in a process in which the another terminal device is handed over from the 4G network to the 2G/3G network, and preferably, may be frequencies that are used to access the 2G/3G network by another terminal device during network handover, where a location area of the another terminal device in the process in which the another terminal device is handed over from the 4G network to the 2G/3G network is the same as a current location area of the terminal device. In addition, relationships that are between 4G and a 2G/3G frequency and that are corresponding to different terminal devices in different areas may be saved by using cloud knowledge bases. When the terminal device enters a corresponding area, a cloud server may deliver, to the terminal device, a cloud knowledge base corresponding to the area, and the terminal device may directly obtain, from the cloud knowledge base, a frequency that is to be used during fallback. For example, when the terminal device is moved from Shanghai to Shenzhen, the terminal device may directly receive a relationship that is between 4G and a 2G/3G frequency, that is saved by the cloud server when another terminal device is in Shenzhen, and that is delivered by the cloud server. When the terminal device needs to be handed over from the 4G network to the 2G/3G network, but receives no frequency delivered by the network device, the terminal device may directly obtain, from the received relationship between 4G and a 2G/3G frequency, a frequency that can be used during fallback. Therefore, the terminal device can more easily obtain the frequency that is to be used during fallback.

Optionally, location areas may be divided on a basis of a country, a city, an LAI, or the like. This is not limited in the present invention.

In this embodiment of the present invention, optionally, as shown in FIG. 2 and FIG. 3, if the RRC release message carries no frequency information, and the terminal device obtains no historical frequency, the terminal device may perform procedures in S170 and S180.

S170. The terminal device obtains a frequency from a frequency band supported by 2G/3G.

Preferably, the terminal device may select a first frequency from frequencies supported by 2G/3G.

S180. The terminal device constructs a message that carries the frequency.

That is, if the terminal device receives no 2G/3G frequency delivered by the network device, and fails to obtain a historical frequency, the terminal device may perform full frequency band search on the frequency band supported by the 2G/3G network, and select a frequency from the frequency band, to make a call or answer a call.

For example, the terminal device may first select the first frequency from the frequency band supported by 2G/3G For example, a first frequency in a 2G GSM system is 890.2 MHz. Then, the terminal device internally constructs a message that carries the first frequency. If the terminal device can find the first frequency, the terminal device accesses the 2G network by using the first frequency, to make a call or answer a call. If the terminal device fails to find the first frequency, the terminal device performs full frequency band search on a frequency band supported by the 2G network, and determines, according to a search result, a frequency that is to be used to access the 2G network.

Further, if the terminal device receives frequency information delivered by the network device, and the terminal device also obtains frequencies saved by the terminal device and frequencies that are previously used by another terminal device during fallback, the terminal device may preferentially determine, from frequencies indicated by the frequency information, a frequency that is to be used during fallback. If the terminal device fails to determine, from the frequencies indicated by the frequency information, a frequency that is to be used during fallback, the terminal device determines, from the frequencies saved by the terminal device, a frequency that is to be used during fallback. If the terminal device fails to determine, from the frequencies saved by the terminal device, a frequency that is to be used during fallback, the terminal device further determines, from the frequencies that are previously used by the another terminal device during fallback, a frequency that is to be used during fallback. After the foregoing procedures, if the terminal device still cannot obtain a frequency that can be used during fallback, the terminal device may perform full frequency band search, to determine a frequency that can be used during fallback. A method for determining, by the terminal device from a plurality of optional frequencies, a frequency that is to be used during fallback is the same as a method in a related process in the prior art. Details are not described herein. Therefore, even if the network device delivers an incorrect frequency, the terminal device can answer a call or make a call.

In this embodiment of the present invention, optionally, when the historical frequencies obtained by the terminal device include both a frequency supported by the 2G network and a frequency supported by the 3G network, the terminal device may preferentially fall back to the 2G network by using the frequency supported by the 2G network.

Figure 4:
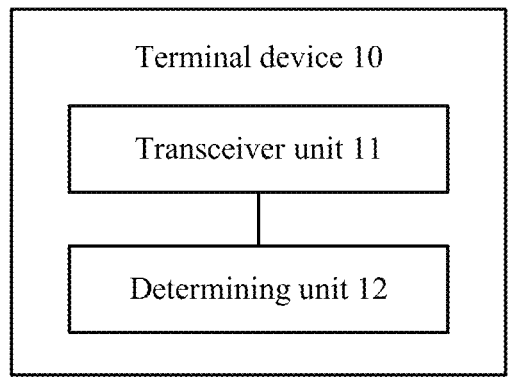
FIG. 4 is a schematic block diagram of a terminal device according to an embodiment of the present invention.

The voice service processing method according to the embodiments of the present invention is described above in detail with reference to FIG. 2 and FIG. 3. A terminal device according to an embodiment of the present invention is described below in detail with reference to FIG. 4. As shown in FIG. 4, a terminal device 10 includes a transceiver unit 11 and a determining unit 12.

The transceiver unit 11 is configured to send a first message to a network device of a first network, where the first message is used to request a circuit switched fallback CSFB voice service.

The transceiver unit 11 is further configured to receive a second message sent by the network device of the first network, where the second message is used to instruct the terminal device to perform network redirection.

The determining unit 12 is configured to: if the second message carries no frequency information, determine a redirection frequency, where the redirection frequency is a frequency supported by a second network.

The transceiver unit 11 is further configured to send, based on the redirection frequency, a connection request to a network device of the second network, to perform a CS voice service.

Therefore, according to the terminal device in this embodiment of the present invention, when the terminal device needs to perform a voice service, even if the terminal device receives no frequency information delivered by a network, the terminal device can determine an appropriate redirection frequency, and access, based on the redirection frequency, a network that supports the voice service, to answer a call or make a call. Therefore, voice communication experience of a user is improved.

In this embodiment of the present invention, optionally, the determining unit 12 is specifically configured to: obtain first historical frequencies, where the first historical frequencies are frequencies that are used before the determining unit 12 determines the redirection frequency and that are used to access the second network by the terminal device in a process in which the terminal device is handed over from the first network to the second network; and determine one of the first historical frequencies as the redirection frequency.

In this embodiment of the present invention, optionally, the determining unit 12 is specifically configured to: obtain second historical frequencies, where the second historical frequencies are frequencies that are used before the determining unit 12 determines the redirection frequency and that are used to access the second network by another terminal device in a process in which the another terminal device is handed over from the first network to the second network; and determine one of the second historical frequencies as the redirection frequency.

In this embodiment of the present invention, optionally, a location area of the another terminal device in the process in which the another terminal device is handed over from the first network to the second network is the same as a current location area of the terminal device.

In this embodiment of the present invention, optionally, the transceiver unit 11 is further configured to receive the second historical frequencies sent by a cloud server.

In this embodiment of the present invention, optionally, the determining unit 12 is further configured to save a correspondence between the first network and the redirection frequency.

In this embodiment of the present invention, optionally, the first network is a 4G network, and the second network is a 2G network.

It should be understood that the terminal device 10 herein is implemented in a form of a function unit. The term "unit" herein may refer to an application-specific integrated circuit (Application Specific Integrated Circuit, "ASIC" for short), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the terminal device 10 may be configured to perform the procedures and/or steps in the method 100 in the foregoing method embodiment. To avoid repetition, details are not described herein again.

Figure 5:
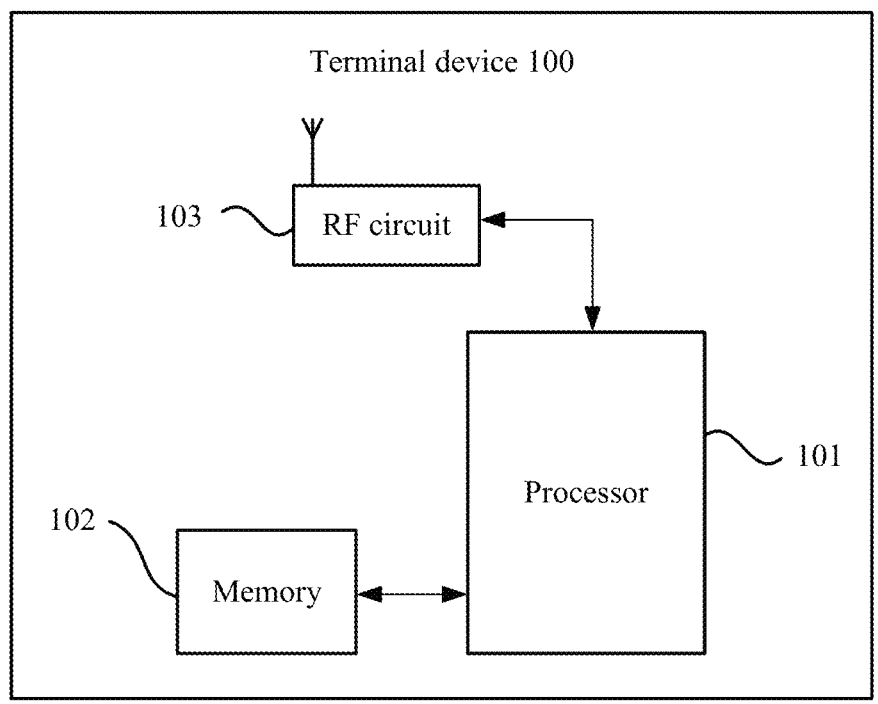
FIG. 5 is a schematic block diagram of a terminal device according to another embodiment of the present invention.

As shown in FIG. 5, an embodiment of the present invention further provides a terminal device 100. The terminal device 100 includes a processor 101, a memory 102, and a radio frequency (Radio Frequency, "RF" for short) circuit 103. A person skilled in the art may understand that a structure of the terminal device shown in FIG. 5 constitutes no limitation on the terminal device. The terminal device may include more or fewer parts than those shown in the figure, or combine some parts, or split some parts, or have different part arrangements.

The radio frequency circuit 103 may also be referred to as a transceiver, and is configured to send a first message to a network device of a first network. The first message is used to request a circuit switched fallback CSFB voice service. The radio frequency circuit 103 is further configured to receive a second message sent by the network device of the first network. The second message is used to instruct the terminal device to perform network redirection. The processor 101 is configured to: if the second message carries no frequency information, determine a redirection frequency. The redirection frequency is a frequency supported by a second network. The radio frequency circuit 103 is further configured to send, based on the redirection frequency, a connection request to a network device of the second network, to perform a CS voice service.

Therefore, according to the terminal device in this embodiment of the present invention, when the terminal device needs to perform a voice service, even if the terminal device receives no frequency information delivered by a network, the terminal device can determine an appropriate redirection frequency, and access, based on the redirection frequency, a network that supports the voice service, to answer a call or make a call. Therefore, voice communication experience of a user is improved.

It should be understood that in this embodiment of the present invention, the processor 101 may be a central processing unit (Central Processing Unit, "CPU" for short), or the processor 101 may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

The memory 102 may be configured to store a software program and a module. The processor 101 runs the software program and the module that are stored in the memory 102, to execute various function applications of the terminal device 100 and process data. The memory 102 may mainly include a program storage area and a data storage area. The program storage area may store an operating system, an application program required by at least one function (such as a sound play function or an image play function), and the like. The data storage area may store data (such as audio data or a phone book) created according to use of the terminal device 100, and the like. In addition, the memory 102 may include a high-speed random access memory, or may include a nonvolatile memory, such as at least one magnetic disk storage device, a flash memory device, or another volatile solid-state storage device.

The RF circuit 103 may be configured to: receive and send a signal in an information receiving or sending process or a call process, and in particular, after receiving downlink information of a base station, send the downlink information to the processor 101 for processing; and send designed uplink data to the base station. Generally, the RF circuit 103 includes but is not limited to an antenna, at least one amplifier, a transceiver, a coupler, a low noise amplifier (Low Noise Amplifier, "LNA" for short), a duplexer, or the like. In addition, the RF circuit 103 may communicate with a network and another device by means of wireless communication. The wireless communication may use any communications standard or protocol, including but not limited to GSM, GPRS, CDMA, WCDMA, LTE, an email, a short message service (Short Messaging Service, "SMS" for short), and the like.

In an implementation process, the steps in the foregoing method may be completed by using an integrated logic circuit of hardware in the processor 101 or an instruction in a form of software. The steps of the method disclosed with reference to the embodiments of the present invention may be directly performed and completed by a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 102. The processor 101 reads information in the memory 102, and completes the steps of the foregoing method in combination with hardware of the processor. To avoid repetition, details are not described herein again.

Optionally, in an embodiment, the processor 101 is specifically configured to: obtain first historical frequencies, where the first historical frequencies are frequencies that are used before the processor 101 determines the redirection frequency and that are used to access the second network by the terminal device in a process in which the terminal device is handed over from the first network to the second network; and determine one of the first historical frequencies as the redirection frequency.

Optionally, in an embodiment, the processor 101 is specifically configured to: obtain second historical frequencies, where the second historical frequencies are frequencies that are used before the processor 101 determines the redirection frequency and that are used to access the second network by another terminal device in a process in which the another terminal device is handed over from the first network to the second network; and determine one of the second historical frequencies as the redirection frequency.

Optionally, in an embodiment, a location area of the another terminal device in the process in which the another terminal device is handed over from the first network to the second network is the same as a current location area of the terminal device.

Optionally, in an embodiment, the RF circuit 103 is further configured to receive the second historical frequencies sent by a cloud server.

Optionally, in an embodiment, the memory 102 is configured to save a correspondence between the first network and the redirection frequency.

Optionally, in an embodiment, the first network is a 4G network, and the second network is a 2G network.

It should be understood that the terminal device 100 according to this embodiment of the present invention may be corresponding to the terminal device 10 in the embodiments of the present invention, and may be corresponding to the terminal device that performs the method 100 according to the embodiments of the present invention, and the foregoing and other operations and/or functions of the modules in the terminal device 100 are separately intended to implement procedures corresponding to the terminal device in the method in FIG. 2 and FIG. 3. For brevity, details are not described herein again.

Therefore, according to the terminal device in this embodiment of the present invention, when the terminal device needs to perform a voice service, even if the terminal device receives no frequency information delivered by a network, the terminal device can determine an appropriate redirection frequency, and access, based on the redirection frequency, a network that supports the voice service, to answer a call or make a call. Therefore, voice communication experience of a user is improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions in the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A voice service processing method, wherein the method comprises:

sending, by a terminal device, a first message to a network device of a first network, wherein the first message requests a circuit switched fallback (CSFB) voice service;

receiving, by the terminal device, a second message sent by the network device of the first network, wherein the second message instructs the terminal device to perform network redirection;

with the second message carrying no frequency information of a second network for the network redirection, determining, by the terminal device, a redirection frequency, wherein the redirection frequency is a frequency supported by the second network, and internally constructing, by the terminal device, a message that carries the redirection frequency; and sending, by the terminal device based on the redirection frequency obtained from the internally constructed message carrying the redirection frequency, a connection request to a network device of the second network, to perform a circuit switched (CS) voice services, wherein the determination of the redirection frequency comprises:

obtaining, by the terminal device, historical frequencies, wherein the historical frequencies are frequencies that are used to access the second network by another terminal device in a process in which the another terminal device is handed over from the first network to the second network, and a location area of the another terminal device is the same as a current location area of the terminal device.

2. The method according to claim 1, wherein the determination of the redirection frequency further comprises:

determining, by the terminal device, one of the obtained historical frequencies as the redirection frequency.

3. The method according to claim 2, wherein the location area of the another terminal device is a location area of the another terminal device in the process in which the another terminal device is handed over from the first network to the second network.

4. The method according to claim 2, wherein the obtaining, by the terminal device, of the historical frequencies comprises:

receiving, by the terminal device, the historical frequencies sent by a cloud server.

5. The method according to claim 1, wherein the method further comprises:

saving, by the terminal device, a correspondence between the first network and the redirection frequency.

6. The method according to claim 1, wherein the first network is a Fourth Generation Mobile Communications Systems (4G) network, and the second network is a Second Generation Mobile Communication Systems (2G) network.

7. A terminal device, comprising a processor, a memory, and a transceiver, wherein the processor, the memory, and the transceiver are connected by using a bus system;

the memory is configured to store instructions;

the transceiver is controlled by the processor to receive and send a message, to implement communication between the terminal device and a network device; and the processor is configured to invoke the instructions stored in the memory, to make the terminal device perform:

sending a first message to a network device of a first network, wherein the first message requests a circuit switched fallback (CSFB) voice service;

receiving a second message sent by the network device of the first network, wherein the second message instructs the terminal device to perform network redirection;

with the second message carrying no frequency information of a second network for the network redirection, determining, by the terminal device, a redirection frequency, wherein the redirection frequency is a frequency supported by the second network, and internally constructing, by the terminal device, a message that carries the redirection frequency, and sending, based on the redirection frequency obtained from the internally constructed message carrying the redirection frequency, a connection request to a network device of the second network, to perform a circuit switched (CS) voice service, wherein the determination of the redirection frequency comprises:

obtaining, by the terminal device, historical frequencies, wherein the historical frequencies are frequencies that are used to access the second network by another terminal device in a process in which the another terminal device is handed over from the first network to the second networks, and a location area of the another terminal device is the same as a current location area of the terminal device.

8. The terminal device according to claim 7, wherein the determination of the redirection frequency further comprises:

determining, by the terminal device, one of the obtained historical frequencies as the redirection frequency.

9. The terminal device according to claim 8, wherein the location area of the another terminal device is a location area of the another terminal device in the process in which the another terminal device is handed over from the first network to the second network.

10. The terminal device according to claim 8, wherein the obtaining of the historical frequencies comprises:

receiving, by the terminal device, the historical frequencies sent by a cloud server.

11. The terminal device according to claim 7, wherein the processor is further configured to invoke the instructions to make the terminal device perform:

saving a correspondence between the first network and the redirection frequency.

12. The terminal device according to claim 7, wherein the first network is a Fourth Generation Mobile Communications Systems (4G) network, and the second network is a Second Generation Mobile Communication Systems (2G) network.

* * * * *

UNITED STATES PATENT AND TRADEMARK OFFICE
CERTIFICATE OF CORRECTION

PATENT NO. : 11,246,061 B2  
APPLICATION NO. : 16/089440  
DATED : February 8, 2022  
INVENTOR(S) : Li et al.

Page 1 of 1

It is certified that error appears in the above-identified patent and that said Letters Patent is hereby corrected as shown below:

On the Title Page

In "OTHER PUBLICATIONS" section:
Replace "International Search Report and Written Opinion issued in International Application No. PCT/CN2016/0//871 dated Dec. 15, 2016, 21 pages" with "International Search Report and Written Opinion issued in International Application No. PCT/CN2016/077871 dated Dec. 15, 2016, 21 pages";

In the Claims

Claim 1, at Column 14, Line 21, replace "services" with "service"; and

Claim 7, at Column 15, Line 23, replace "networks" with "network".

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*